2,988,507
HIGH TEMPERATURE ANTI-FRICTION BEARING GREASE

James H. Norton, Corunna, Ontario, and Warren C. Pattenden, Courtright, Ontario, Canada, assignors to Esso Research and Engineering Company, a corporation of Delaware
No Drawing. Filed Oct. 2, 1957, Ser. No. 687,613
3 Claims. (Cl. 252—42.1)

This invention relates to a grease particularly suited for use at relatively high temperatures in anti-friction bearings. More particularly, this invention proposes a novel grease, and the method of making it, characterized by being thickened with a partial complex between the salt of an unsaturated low molecular weight monocarboxylic acid and a soap of a high molecular weight unsaturated fatty acid, the complex being associated with a sodium phosphate.

In brief compass, this invention proposes a grease composition having a worked penetration after milling below 260 mm./10 at 77° F., and a running-in-temperature in the cartridge bearing test of under 30° F. The novel grease of this invention comprises a lubricating oil containing a grease thickening amount in the range of 15 to 40 wt. percent of a partial complex between sodium crotonate and a sodium soap of an unsaturated monocarboxylic acid having in the range of 14 to 22 carbon atoms per molecule. The molar ratio of sodium crotonate to sodium soap is within the range of 0.1 to 10, preferably 0.5 to 2. The grease also contains, as an antioxidant and extreme pressure agent, in the range of 0.1 to 15 wt. percent, preferably 1 to 10 wt. percent, of a phosphate selected from the group consisting of disodium phosphate and trisodium phosphate. This grease composition is characterized by its manufacturing temperature. The sodium crotonate, the sodium soap, and the phosphate are heated during manufacture to a temperature in the range of 300 to 425° F., preferably in the range of 375 to 425° F. for a time in the range of 20 minutes to 4 hours, preferably 30 to 60 minutes at the higher preferred temperature, while in admixture with at least a dispersing portion of the lubricating oil, to obtain in good yields what might be termed "a partial complex."

The grease product of this invention is a premium grease exceptionally suited for use in sealed-for-life anti-friction bearings. A grease for this type of service desirably has a low "running-in" temperature. This running-in temperature is the temperature rise above ambient temperature imparted to the anti-friction bearing by the grease due to its composition and physical properties when the bearing is used for the first time. Greases with low running-in temperature characteristics are mandatory for certain critical operations, such as with spindles, and in electric motors.

This improved running-in temperature property of the novel grease composition of this invention is herein characterized by reference to a modified Norma-Hoffman S-3609 bearing test, hereafter called the cartridge bearing test. This test is carried out as follows: Thirty grams of grease (60% pack) are packed into the bearing and the seals are replaced. The bearing is mounted on a shaft and supported inside an SKF pillow block. The shaft is suitably coupled to a 3600 r.p.m. motor. The maximum bearing temperature rise above ambient during the first cycle is taken as the running-in temperature for the grease. The cycles used during tests are of 20 hours' duration, with 4 hours between them.

In addition to the cartridge bearing test, the NLGI spindle test was used to obtain the running-in temperature of certain greases. For this test, 2 gms. (50% pack) of grease were placed in a Norma-Hoffman 204 bearing and the bearing and shields replaced on the spindle shaft. The bearing was rotated at 10,000 r.p.m. for 20 hours on, 4 hours off, cycles. The maximum temperature rise above ambient was taken as the running-in temperature of the grease.

This test was used to study the temperature effect in smaller bearings. In actual practice, pre-lubricated anti-friction bearings are packed to 25–30% of available air space. The larger cartridge bearings may contain up to a 60% pack of grease.

Greases having low running-in temperature characteristics show approximately the same temperature rise in the cartridge bearing test as in the NLGI spindle test. These tests, therefore, can be used interchangeably.

The novel grease composition of this invention is distinguished from the prior art grease compositions in that it has an exceptionally low running-in temperature as determined by the cartridge bearing test. The running-in temperature rise is under 30° F., while for most prior art grease compositions in this test the running-in temperature rise is usually above 50° F. The grease composition of this invention is further characterized by having a worked penetration after milling under 260 mm./10 at 77° F., while still achieving this low running-in temperature rise.

It is to be noted that the partial soap-salt complex used to thicken the grease composition of this invention is formed from unsaturated acids. It is believed that these unsaturated acids are, in part, responsible for the good running-in characteristics of the grease. At present there are no known saturated soap systems which give equivalent performance. The exact reason for the superior performance of the unsaturated soap system is not definitely known, but is believed to be in part because unsaturated greases harden on initial shearing, and then soften on prolonged shearing. The rate at which the change in consistency occurs undoubtedly affects the running-in temperature rise, and this rate of change is probably controlled in the manufacture of a grease according to this invention. Thus, when a bearing containing the grease of this invention is first turned over, a major portion of the grease is probably initially thrown out of the path of the balls or rollers of the anti-friction bearing, the small amount of grease remaining in the raceway being rapidly softened by shearing until its viscosity approaches that of the base oil. In this way, very little work is expended against the grease, and the bearing temperature rise is quite small.

The good running-in temperature characteristics of the complex thickened grease product of this invention is dependent on the manufacturing temperature. The manufacturing temperature, it is believed, affects the degree of complexing between the soaps and salts.

Many types of "complex" grease thickeners are known to the prior art. Some of them are chemical combinations, and others are physical associations. The type herein contemplated is believed to be of the ionic type, such that when a complex is achieved, a new crystalline entity is formed by the ionically associated soaps and salts.

The soap used in forming the grease of this invention is an unsaturated fatty acid soap having in the range of 14 to 22 carbon atoms per molecule. Examples are lauroleic, myristoleic, palmitoleic, oleic, gadoleic and erucic. Commercial mixtures of these types of acids can, of course, be used. For best results, the acids should have an unsaturation, as indicated by an iodine number, in the range of 80 to 100.

The acid used to form the low molecular weight carboxylic acid salt is crotonic acid. Commercial mixtures containing this acid in at least 80% concentration can be used. Preferably, the commercial mixture used has an iodine number in the range of 240 to 300.

While the sodium crotonate-sodium soap is the principal thickening ingredient used in the grease composition of this invention, up to 10% of the thickener can comprise other known thickeners such as lithium soaps, calcium soaps, and other types of complexes, especially complexes of calcium soaps with calcium acetates.

The unsaturated sodium soap and the sodium crotonate, by themselves, have very poor oxidation resistance. When, however, the sodium soaps and sodium crotonate are heated to a temperature above about 300° F., they begin to react to form a soap-salt complex. The reaction appears to be complete at temperatures close to 500° F. The oxidation resistance of this new crystalline complex is superior to that of the unsaturated soap and salt alone, but still could be somewhat improved. For this reason, and also to impart extreme pressure properties, disodium phosphate or trisodium phosphate is added to the grease composition of this invention. The trisodium phosphate imparts the greatest degree of oxidation resistance, and both of the phosphates impart about the same degree of improvement in the extreme pressure properties of the grease.

The sodium phosphate, however, greatly affects the plastic temperature of the grease. For example, if a grease made from sodium oleate has a plastic temperature of around 200° F. without trisodium phosphate being present, the plastic temperature will decrease to about 70° F. if 3.0% of trisodium phosphate is present, and the grease obtained is rubbery, ropy, and plastic at room temperature. It is, in part, for this reason that it is necessary to use the low molecular weight acid salt, sodium crotonate in the composition. The crotonate, in partially complexing with the soap, gives rise to the grease's good running-in characteristics, and also prevents the phosphate and soap from forming a plastic, rubbery product.

Suitable base oils for manufacturing the grease compositions of this invention can be derived from either animal, vegetable, mineral or synthetic sources. The base oil has, preferably, a viscosity at 210° F. in the range of 40 to 140 SSU, and a viscosity index in the range of 40 to 120. Suitable synthetic oils are the silicone fluids, diester oils such as di-2-ethyl-hexyl sebacate, complex esters such as the one formed by heating di-2-ethyl-hexanol, polyethylene glycol (200) and adipic acid in the molar ratio of 2/1/2, phosphonate oils, etc. Mineral oils are the preferred base oils.

The grease composition can be manufactured in any convenient manner, it only being essential for the purpose of this invention that once the sodium crotonate, sodium soap, and sodium phosphate are present in the lubricating oil menstruum, the admixture be heated to a temperature in the range of 300° to 425° F. for a time in the range of 20 minutes to 4 hours to obtain the desired and proper degree of complexing, and also to obtain a satisfactory yield. Preformed salts and soaps can be used if desired.

A preferred method of manufacturing is to add both the crotonic acid and the unsaturated $C_{14}$-$C_{22}$ fatty acid to a portion of the lubricating base oil. This admixture is heated to a temperature in the range of 140 to 180° F., and a water solution of the sodium hydroxide is added. The soap stock so obtained is then dehydrated at a temperature in the range of 250 to 320° F., and the excess alkali is preferably adjusted to be in the range of 0.1 to 1.0, expressed as percent NaOH. After this, the desired amount of the sodium phosphate in a water solution is incrementally added to the soap stock, and the mixture is again dehydrated at 280-320° F. The remainder of the oil is then preferably added, and the grease is cooked at a temperature in the range of 300 to 425° F. for a time in the range of 20 minutes to 4 hours to obtain the desired yield and degree of complexing between the carboxylic acid salt and soap. Following this, the grease is cooled, preferably with continuous stirring, to about 150 to 200° F., at which temperature additional oxidation inhibitor, such as phenyl alpha naphthylamine, can be added if desired. After the grease has been cooled, it is milled as in a Manton-Gaulin homogenizer or in a Morehouse colloidal mill, to disperse the thickener and to adjust the hardness of the grease.

Various grease additives conventionally used in the art can, of course, be included in the grease formulations of this invention. Such materials as oxidation inhibitors; tackiness agents, e.g., polyisobutylene; color additives; additional E.P. agents, e.g., calcium acetate; and the like can be combined to enhance specific properties desired in the grease compositions.

EXAMPLE I

A grease having the following composition was made up:

| Formula, percent by weight | Charging Formula | Finished Formula |
|---|---|---|
| Oleic Acid | 26.2 | 22.2 |
| Crotonic Acid | 7.2 | 6.1 |
| Sodium Hydroxide (anhydrous) | 7.2 | 6.1 |
| Trisodium Phosphate (anhydrous) | 4.9 | 4.2 |
| Mineral Oil [1] | 53.5 | 60.55 |
| Phenyl Alpha Naphthylamine—anti-oxidant | 1.0 | 0.85 |

[1] 90 V.I., 550 SSU at 100° F. solvent refined Western Canadian distillate.

This grease was manufactured in the following manner:

900 pounds of the oil were charged to a gas-fired kettle followed by 210 pounds of crotonic acid and 760 pounds of oleic acid. These ingredients were heated to 150° F. prior to adding 420 pounds of 50 Bé. sodium hydroxide, followed by 100 pounds of water. The soap stock was dehydrated at 300° F. and the excess alkali was adjusted to be in the range of 0.1 to 0.4%, as NaOH.

286 pounds of trisodium phosphate hydrate (50% water) were dissolved in an equal weight of water. This solution was carefully added in small increments to the soap at 300° F. Complete dehydration of the complex soap stock occurred prior to adding the remainer of the oil (650 lbs.). The fires were increased and the grease was cooked at 400-420° F. for 30 minutes prior to pumping the grease over into a second stir-down kettle previously heated to 300° F. by steam. The grease was stirred constantly while cooling. The second oxidation inhibitor (29 lbs. of the amine) was added at 200° F. Additional oil was added and the finished grease was milled in a Morehouse colloid mill to bring it within the worked penetration range of 180 to 260 mm./10. The finished grease was packaged into drums at a temperature of 100-150° F.

This grease had the following inspections:

Worked consistency, mm./10, 77° F. _____ 215
Dropping point, °F. _____ 500+
ASTM Norma-Hoffman bomb at 210° F.:
    100 hrs., lbs. loss _____ 1.5
    500 hrs., lbs. loss _____ 3.5
NLGI spindle life at 300° F., hrs. _____ 2850
Running-in temperature rise on NLGI
    spindle, °F. _____ 15
Timken E.P. load, lbs. _____ 38

EXAMPLE II

Four additional greases were prepared to demonstrate the effect of the temperature of preparation. Except for grease II, the method of preparation was the same as that in Example I. The mineral oil used for the four compositions was the same as in Example I.

Table I gives the formulations and inspections of these greases.

Table I

| Designation | II | | III | | IV | | V | | |
|---|---|---|---|---|---|---|---|---|---|
| | A | B | C | D | E | F | G | H | I |
| Processing Information | Charging Formula [1] | Finished Formula | Charging Formula | Finished Formula | Charging Formula | Finished Formula | Charging Formula | | Finished Formula |
| Manufacturing Temp., °F | | 300 Steam Kettle [3] | | 400 Fire Kettle [2] | | 450 Fire Kettle [2] | | | 500 Fire Kettle [2] |
| Formula, Percent by Wt.: | | | | | | | | | |
| Oleic Acid | 23.6 | 23.6 | 21.0 | 21.0 | | 17.5 | | 16.8 | 13.5 |
| Crotonic Acid | 6.4 | 6.4 | 6.5 | 6.5 | | 5.4 | | 5.2 | 4.2 |
| Trisodium Phosphate | 3.6 | 3.6 | 5.0 | 5.0 | Same as for III | 4.2 | Same as for III | 4.0 | 3.2 |
| Sodium Hydroxide | 8.2 | 8.2 | 6.0 | 6.0 | | 5.0 | | 4.8 | 3.9 |
| Phenyl Alpha Naphthylamine | 0.9 | 0.9 | 1.0 | 1.0 | | 0.8 | | 0.8 | 0.6 |
| Mineral Oil | 56.8 | 56.8 | 60.5 | 60.5 | | 67.1 | | 68.4 | 74.6 |
| Sodium Sulphonate (65%) | 0.5 | 0.5 | | | | | | | |
| Inspections: | | | | | | | | | |
| Before Milling— | | | | | | | | | |
| Wkd. Penetration, mm./10 @ 77° F | 322 | 322 | 287 | 287 | 197 | 330 | (100) Unwkd. | 170 | 300 |
| After milling and oiling— | | | | | | | | | |
| Unwkd. Penetration, mm./10 @ 77° F | | 238 | | 210 | | 223 | | | |
| Wkd. Penct., mm./10 @ 77° F | | 250 | | 230 | | 225 | | | 246 |
| ASTM Dropping Point, °F | | 500+ | | 480 | | 480 | | | 500+ |
| NLGI Spindle Test, hrs. @ 300° F | | | | 2,788 | | | | | |
| Running-In Temperature, °F | | | | | | | | | |
| Cartridge Bearing Assembly: [4] | | | | | | | | | |
| Temp. rise, 1st cycle, °F | | 10 | | 15 | | 70 | | | 90 |
| Temp. rise, 2nd cycle, °F | | 10 | | 15 | | | | | |

[1] Charging formula is actual composition exposed to maximum processing temperature.
[2] Heated for 20–30 minutes at maximum temperature.
[3] Held at 300° F. for 3–4 hours.
[4] Norma-Hoffman S-3609 bearing packed 60% full of grease.

Grease II was prepared in a conventional steam kettle at 300° F. In order to dehydrate the soap stock and add the remainder of the oil, this grease was held at 300° F. for 3 to 4 hours. The running-in temperature for the grease prepared at 300° F. is low, being only 10° F. The yield for this grease (penetration for given soap content) is, however, lower than for any of the others. The soap content of this grease was higher in order to obtain a grease having a worked penetration below 260 mm./10. For this reason, the use of a fired kettle and temperature in the range of 325° to 425° F. and times in the range of 30 to 60 minutes are much preferred. The sodium sulphonate only aids in dispersing the soap to obtain a smoother grease.

Greases III, IV and V were prepared from the same original composition shown in column C. However, as the temperature is increased, so is the yield. At 500° F., grease V (column G) at 21% oleic acid produces a very hard grease of 100 unworked penetration. Consequently, this grease had to be oiled back at temperatures around 300° F. and subsequently milled to yield a grease with a worked penetration of 246 (13% oleic). The mole ratio of the oleic acid and crotonic acid is constant at 1:1.

These data show that in order to obtain a grease in good yields having the proper consistency and running-in temperature, the manufacturing temperature should be in the range of about 300° to 425° F.

Having described this invention, what is sought to be protected by Letters Patent is succinctly set forth in the following claims.

What is claimed is:

1. A grease composition having a worked penetration after milling under 260 mm./10 at 77° F., and a running-in temperature in the cartridge bearing test of under 30° F., which comprises a lubricating oil containing a grease-forming amount in the range of 15 to 40 weight percent of sodium crotonate and the sodium soap of an unsaturated monocarboxylic acid having in the range of 14 to 22 carbon atoms per molecule, the molar ratio of sodium crotonate to sodium soap being in the range of 0.1 to 10.0, and 0.1 to 15 weight percent of a phosphate selected from the group consisting of disodium phosphate and trisodium phosphate, said sodium crotonate, sodium soap and phosphate being heated to a temperature in the range of 300 to 425° F. for a time in the range of 20 minutes to 4 hours, while in admixture with at least a dispersing portion of said lubricating oil.

2. In the manufacture of a grease comprising a lubricating oil thickened within the range of 15 to 40 weight percent of sodium-crotonate and the sodium soap of an unsaturated monocarboxylic acid having in the range of 14 to 22 carbon atoms per molecule, the molar ratio of sodium crotonate to sodium soap being in the range of 0.5 to 2.0, said grease also containing 1 to 10 weight percent of a phosphate selected from the group consisting of disodium phosphate and trisodium phosphate, the improvement which comprises heating said sodium crotonate, sodium soap and phosphate while in admixture with at least a dispersing portion of said lubricating oil to a temperature in the range of 300 to 425° F. for a time in the range of 20 minutes to 4 hours, to obtain a partial ionic complex therebetween, said grease having a running-in temperature in the cartridge bearing test of under 30° F. and a worked penetration after milling under 260 mm./10 at 77° F.

3. A grease composition comprising a mineral lubricating oil having a viscosity of about 550 SSU at 100° F., about 4.2 weight percent of trisodium orthophosphate, and a grease thickener formed in at least a dispersing portion of said mineral oil from the soap and salt of about 22.2 weight percent oleic acid, about 6.1 weight percent crotonic acid, and about 6.1 weight percent sodium hydroxide, said soap and salt being heated to a temperature of about 400–420° F. for about 30 minutes, said composition having a worked penetration after milling of 215 mm./10 at 77° F., and a running-in temperature in the cartridge bearing test of under 30° F., and said weight percentages being based on final product.

References Cited in the file of this patent

UNITED STATES PATENTS

| | | |
|---|---|---|
| 2,468,099 | Morway | Apr. 26, 1949 |
| 2,565,981 | Morway et al. | Aug. 28, 1951 |
| 2,673,184 | Morway et al. | Mar. 23, 1954 |
| 2,820,762 | King | Jan. 21, 1958 |

FOREIGN PATENTS

| | | |
|---|---|---|
| 706,555 | Great Britain | Mar. 31, 1954 |